United States Patent [19]

Prengaman et al.

[11] 4,229,271
[45] Oct. 21, 1980

[54] METHOD OF RECOVERING LEAD VALUES FROM BATTERY SLUDGE

[75] Inventors: Raymond D. Prengaman, Arlington; Herschel B. McDonald, Red Oak, both of Tex.

[73] Assignee: RSR Corporation, Dallas, Tex.

[21] Appl. No.: 42,158

[22] Filed: .May 24, 1979

Related U.S. Application Data

[63] Continuation of Ser. No. 3,079, Jan. 12, 1979.

[51] Int. Cl.$^2$ ................................................ C25C 1/18
[52] U.S. Cl. .................................... 204/114; 204/117
[58] Field of Search ................................ 204/114, 117

[56] References Cited

U.S. PATENT DOCUMENTS 4,135,997  1/1979  Stauter .................................. 204/117

*Primary Examiner*—R. L. Andrews

*Attorney, Agent, or Firm*—Watson, Leavenworth, Kelton & Taggart

[57] ABSTRACT

A process for recovery of substantially all lead values in battery sludge as metallic lead is disclosed. By means of the process, lead is substantially completely and efficiently recovered as metallic lead in an environmentally acceptable manner. The process comprises (a) subjecting the sludge to low temperature reducing conditions; (b) converting lead sulfates to insoluble nonsulfur containing compounds while solubilizing all sulfur materials and thereafter separating the solid residue by solid-liquid separation techniques; (c) dissolving the solid products resulting from steps (a) and (b) in an acid selected from the group consisting of fluoboric and fluosilicic acid; (d) collecting the supernatant from step (c) by means of solid-liquid separation techniques; and (e) electrowinning the lead from the collected supernatant. The lead peroxide reduction of step (a) may be effected by low temperature reducing roasts or by contacting the lead peroxide with sulfur dioxide gas or sulfites.

11 Claims, 2 Drawing Figures

METHOD OF RECOVERING LEAD VALUES FROM BATTERY SLUDGE

This is a continuation of application Ser. No. 3,079, filed Jan. 12, 1979.

BACKGROUND OF THE INVENTION

Recovery of lead from lead batteries is of significant economic importance, both due to the cost of obtaining lead and the problems of waste lead disposal. In standard commercial methods of recovering lead values from battery scrap, or from the active material of battery scrap, the primary treatment often involves smelting the material in a reverberatory furnace, blast furnace, or electric furnace using standard pyrometallurgical procedures. These pyrometallurgical processes have many disadvantages and drawbacks.

The main disadvantage of pyrometallurgical smelting is that the processes operate at elevated temperatures and generate substantial amounts of sulfur dioxide gas, as well as volatile dusts. The dusts can carry substantial amounts of metal, such as lead, cadmium, arsenic, antimony and the like. In addition, pollution by hydrogen chloride may result from such pyrometallurgical methods if polyvinyl chloride separators or other chloride-containing materials are present in the battery waste. Further, pyrometallurgical methods pose problems of thermal control. Moreover, such processes have become commercially less desirable due to increased fuel costs.

In order to overcome these problems, various methods for controlling emission of pollutants, or for removing potential pollutants prior to smelting have been proposed. These methods, however, do not avoid the problems of thermal control and rising fuel costs. As alternatives, various hydrometallurgical methods have been suggested. However, often such hydrometallurgical techniques do not result in recovery of metallic lead. Moreover, these methods are typically inefficient and do not effect economical recovery of substantially all lead values as metallic lead. Specifically lead peroxide is often not recovered when hydrometallurgical techniques are employed. Problems with losses of lead and with disposal of wastes containing lead are therefore presented by these methods. For these reasons, many hydrometallurgical methods have not received commercial acceptance.

The present invention provides an economical method for recovery of substantially all lead values in battery sludge as metallic lead. By means of this method, all forms of lead in battery sludge can be converted to metallic lead rapidly and efficiently. Since the process maximizes lead recovery, the problems of disposal of waste lead are minimized.

Moreover, the present process avoids the problems encountered in prior art methods for recovery of lead from battery sludge. Not only does this process substantially eliminate emission of sulfur oxides, volatile dust and chlorides but also effectively eliminates problems of thermal control, while minimizing fuel costs.

In sum, in accordance with the present invention, substantially all lead values in battery sludge may be efficiently converted to metallic lead in a manner which is enviromentally acceptable, economically competitive and suitable for large scale commercial operations.

SUMMARY OF THE INVENTION

A rapid method for recovering substantially all lead values from battery sludge as metallic lead is provided. According to the method of the invention, lead peroxide in the sludge is reduced at a low temperature and lead sulfate in the sludge is converted to an insoluble nonsulfur containing lead compound while all sulfur compounds are solubilized. The lead compounds resulting after the conversion and reduction are separated from the sludge and dissolved in fluoboric or fluosilicic acid. The dissolved lead is thereafter recovered as metallic lead by electrowinning.

The peroxide reduction may be effectively accomplished by means of a relatively low temperature reducing roast or by contact with sulfur dioxide gas or by the use of sulfites or bisulfites. The sulfur conversion and solubilization may be effected by means of an ammonium or alkali metal carbonate solution.

BRIEF DESCRIPTION OF DRAWINGS

In FIG. 2 the battery sludge is subjected to chemical reducing conditions, either prior to or simultaneously with the sulfur recovery stage. The sulfur recovery stage is accomplished by means of a carbonate which may be ammonium carbonate.

DETAILED DESCRIPTION OF THE INVENTION

Figure 1:
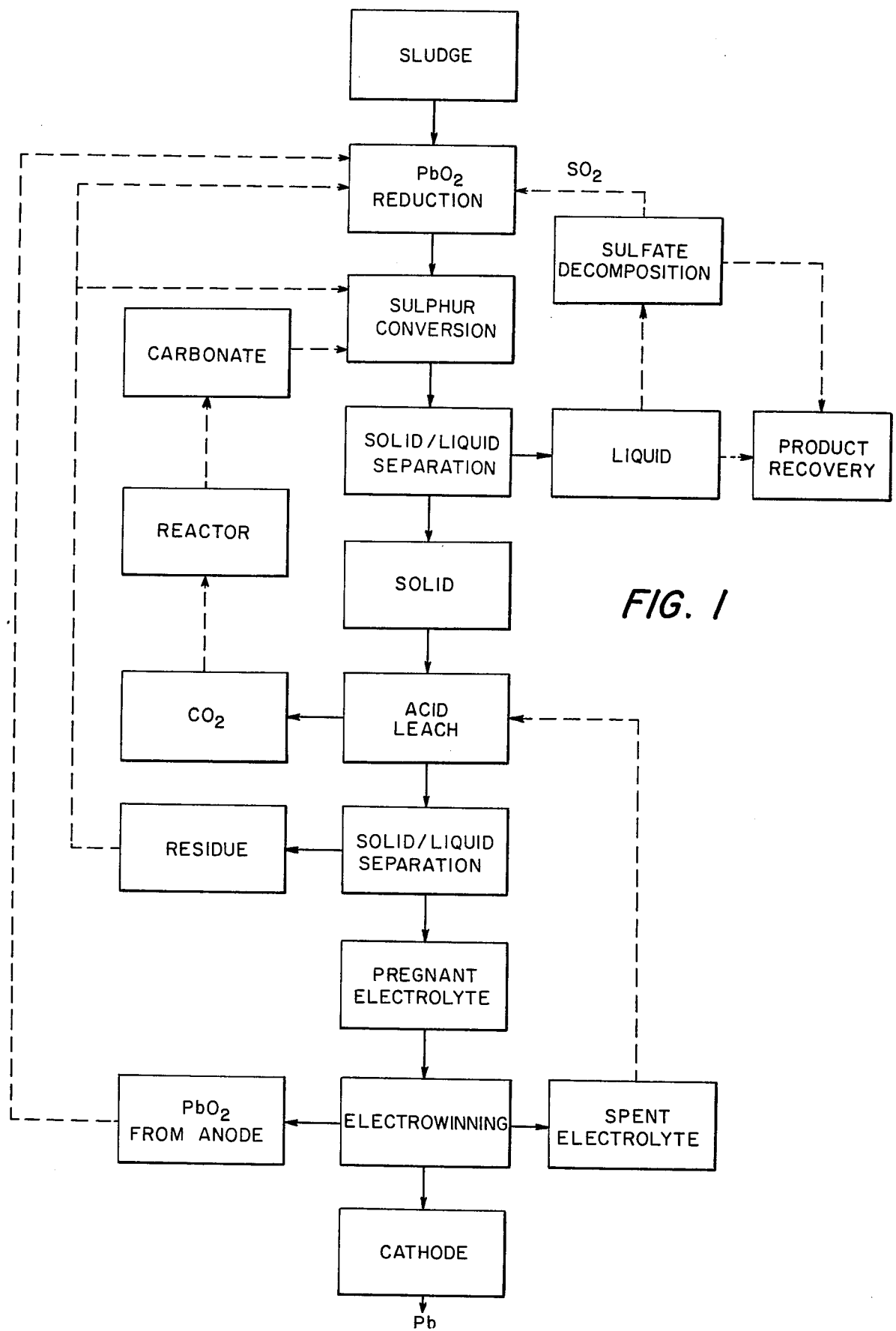
FIG. 1 is a flow sheet or block diagram of the process of the invention in which various possible recycling steps are also depicted.

This invention relates to a method for recovering lead values from battery scrap. By means of the present method, substantially all lead values present in battery sludge may be recovered as metallic lead rapidly and relatively economically without substantial pollution by sulfur dioxide gas or volatile dusts.

In accordance with the method of the invention, lead values in battery sludge are subjected to pretreatments which permit substantially all of the lead to be recovered as metallic lead by electrowinning. The sludge treated in the present method contains the active material of battery scrap and is obtained by removal of the lead grids and case material from battery scrap according to well known techniques. The sludge generally comprises water, sulfuric acid and lead compounds, as well as various organic materials from separators, pieces of plastic and fibers. The main lead compounds in battery sludge are lead peroxide and lead sulfate. A small amont of lead monoxide or metallic lead may also be present.

Although some lead compounds are effectively recovered as metallic lead by electrolysis, lead present in the form of lead peroxide has not generally been recoverable by means of electrolytic techniques conventionally employed in lead recovery. Specifically, lead peroxide is not soluble in either fluoboric or fluosilicic acid and cannot be electrowon therefrom. Thus, although electrolysis employing such acids as electrolytes may be effective for recovery of a number of lead compounds from ores, concentrates and the like, complete lead recovery from battery sludge, specifically lead peroxide recovery, is not effected by such electrolysis. Rather pyrometallurgical methods, with their accompanying problems, have commonly been employed as a means for recovery of substantially all leads values, including lead peroxide, from battery sludge as metallic lead. In contrast to such conventional methods, recovery of substantially all lead values—including lead peroxide—as metallic lead from battery sludge is effected to low temperature without generating substantial amounts of sulfur dioxide gas or volatile dusts by means of the present invention.

According to the present invention battery sludge is subjected to low temperature mild reducing conditions. For purposes of this application, low temperature means temperatures low enough to avoid generation of volatile dusts and/or sulfur dioxide gas, given the conditions of the recovery technique selected. As a result of such low temperature reduction, lead peroxide values are reduced to lead values which, in some cases, may be directly dissolved in an electrolyte, such as fluoboric or fluosilicic acid solution, or which may be converted to such a soluble lead compound by treatment with an appropriate salt or base.

Lead peroxide reduction may be effected by means of a low temperature reducing roast. Temperatures of about 290°–300° C. are generally sufficient to reduce the lead peroxide to a suitable compound. The roast can be carried out in an oven, kiln, roaster or by any other heating method which permits maintenance of a reducing atmosphere during heating. A reducing atmosphere may be maintained by restricting the access of air or by use of a reducing flame in heating the material. The battery sludge is generally dried prior to being subjected to the reducing roast.

For ease of processing the lead peroxide should be reduced principally to lead monoxide, which is readily soluble in various acid electrolytes. Lead peroxide is a strong oxidizing agent and will react with carbon, carbon monoxide or hydrogen to form lead monoxide. In a strong reducing atmosphere, the reduction of lead peroxide can be extremely rapid and can easily proceed beyond lead monoxide to produce lead suboxide or metallic lead. While the lead suboxide is soluble in the electrolyte solutions, the metallic lead may react so slowly as to be rlatively insoluble. It is, thus, desirable that the reducing roast conditions be limited in order to avoid reduction to metallic lead.

Although lead peroxide will rapidly react in a reducing atmosphere to form lead materials, such as lead monoxide, suboxide or metallic lead, it will decompose into $Pb_2O_3$ or $Pb_3O_4$, depending on the temperature to which it is heated, if simply heated in air. These latter lead oxides are relatively insoluble in electrolytic media, such as fluoboric and fluosilicic acids, and, thus, are essentially no better than lead peroxide in terms of lead recovery from battery sludge. Although the $Pb_2O_3$ or $Pb_3O_4$ can be decomposed to lead monoxide at extremely high temperatures (above about 500° C.), such high temperature decomposition of the lead peroxide is effectively a pyrometallurgical technique which does not offer the advantages of the present method.

In the reduction roast, organic materials in the battery sludge may be burned to create the necessary reducing atmosphere. For example, pieces of plastic, separators and fibers may be burned. The carbon present in the organic materials in the battery sludge is generally sufficient to reduce the lead peroxide therein. Should insufficient carbon be present in the sludge, carbon can be added thereto or a reducing atmosphere could be maintained by control of the heating flame. At temperatures of about 290° C., the lead peroxide in battery sludge reacts with the carbon and hydrogen in these materials and is reduced principally to lead monoxide. The lead monoxide may in turn react with lead sulfate in the sludge to form basic lead sulfate.

Typically, reduction of lead peroxide by means of a reducing roast is complete in 15 minutes or less. However, at temperatures below about 290° C., additional time may be required for reduction. Further, the time required for reducing is affected by such factors as the amount of reducing agent and agitation during reduction. Increasing amounts of either will generally reduce the period required for reduction.

It is important that the lead peroxide reducing roast not reach temperatures above about 325° C., if problems with volatile dusts and the production of metallic lead during the reduction roast are to be avoided. By maintaining roasting temperatures near or below such temperatures, metallic values are not volatilized. Thus, pollution problems due to dusts containing substantial amounts of volatile lead and other materials such as cadmium, arsenic, antimony and the like are eliminated. Further, even if the sludge contains chlorides, such as polyvinylchloride, the temperature of the roast is low enough to avoid formation of volatile chloride containing dusts.

As an alternative to the low temperature reducing roast, reduction of the lead peroxide without formation of volatile dusts or generation of substantial gaseous sulfur dioxide may be accomplished by contacting the sludge with sulfur dioxide, or ammonium or alkali metal sulfites or bisulfites. Specifically lead peroxide may be reduced without heating by reaction with sulfur dioxide gas, sulfurous acid, ammonium, sodium, lithium or potassium sulfite or bisulfite. Preferred materials are sodium and ammonium sulfite.

The sulfur dioxide may be introduced into the sludge by bubbling gaseous sulfur dioxide through a slurry of the sludge. The sulfites or bisulfites would be added to or mixed with a slurry suspension of the sludge. By means of this reaction, the lead peroxide is reduced to lead sulfate.

Reduction of lead peroxide with such materials may be effected at room temperature, generally with no more than about 30 minutes being required for complete peroxide reduction. The time required will be in part dependent on the rate of introduction of the sulfur dioxide or sulfites.

The above-described chemical methods for reducing the lead peroxide are preferred over the roasting method for the following reasons: the sludge is treated as a wet slurry and problems of dusting are avoided; somewhat better sulfur removal is effected; and a higher percentage of lead can be leached into the electrolyte solution.

Following reduction of the lead peroxide, as above described, the lead present in the battery sludge is all substantially in the form of lead monoxide, suboxide or sulfate or basic lead sulfate. The battery sludge containing these lead values is treated to convert any lead sulfate to an insoluble non-sulfur containing compound while solubilizing all sulfur materials. By means of this conversion, materials, specifically sulfates, are removed thereby avoiding formation of sulfur dioxide gas during reduction of lead compounds to metallic lead. Where chemical methods, rather than the roasting method, are employed to reduce the lead peroxide, it is possible and preferred to carry out the lead peroxide reduction and sulfur conversion steps simultaneously.

This sulfur conversion may be accomplished by reacting the sludge with a salt or base, the anion of which forms an insoluble compound in combination with lead. Preferred anions are those which upon dissolution in an electrolytic solution yield relatively non-polluting materials which do not interfere with the electrolysis, while forming lead compounds which are readily soluble in the electrolyte, such as carbonates. Specifically, preferred materials for sulfur conversion are those containing alkali metal or ammonium salts, such as sodium, potassium or ammonium carbonate.

Where lead chlorides have been formed during the roasting step, the sulfur conversion step can also be employed to effect conversion thereof as well. Pollution effects due to such chlorides are thereby also avoided.

The sulfur conversion step may be effected by agitating an aqueous slurry of the sludge. The carbonate or other material employed to convert and solubilize the sulfur compounds is preferably present in an amount slightly in excess of that necessary to convert the lead sulfates and solubilize the sulfur compounds in order to ensure maximum conversion of lead to insoluble lead carbonate. If the slurry is too concentrated or there is insufficient reactant present, some of the lead may be solubilized and lost in the solution.

A particularly preferred sulfur conversion method is reaction of the lead sulfate with ammmonium carbonate to form ammonium sulfate and insoluble lead carbonate as described in Acovena's U.S. Pat. No. 3,883,348, the disclosures of which are incorporated herein by reference. According to this method a slight excess of ammonium carbonate is added to an aqueous slurry containing about 33% or less of sludge at room temperature. In order to avoid the need for recycling due to solubilization and loss of lead sulfate in the ammonium sulfate solution, use of insufficient carbonation or more concentrated slurry should be avoided.

Following the sulfur conversion step, the solid product may contain some lead sulfate which did not react to form lead carbonate. This is particularly true when the reducing roast is employed and may be due to coating of relatively large lead sulfate particles with lead carbonate. In order to enhance the lead recovery, this lead material may be recovered by retreating the residue resulting from the hereinafter described leaching step. Alternatively incomplete sulfur conversion may be avoided or minimized by breaking the dry sludge into very fine particles. Of course, where chemical methods of peroxide reduction are employed, sulfur conversion and removal is enhanced since problems with large particles, which result from drying the sludge for the roast, are not encountered.

The supernatant resulting from the sulfur conversion step may be removed from the slurry via solid liquid separation techniques. Depending on the nature of the sulfur conversion agent, the sulfate products in the supernatant may be recovered or discarded or may be recycled for further use and/or treatment in the process. As an example, where ammonium carbonate has been employed to effect sulfur conversion, ammonium sulfate solution would normally be removed from the solid product by filtering. Lead oxide, lead carbonate and basic lead carbonate are the preferred lead materials in the solid product since they are readily separated from the ammonium sulfate solution.

The ammonium sulfate may be crystallized from the separated liquid and recovered as solid ammonium sulfate which can be used as fertilizer. The ammonium sulfate might also be decomposed to yield sulfur dioxide and ammonia which could be recycled for use in the reduction and the sulfur conversion steps respectively.

The solid product from the sulfur conversion step will contain substantially all of the lead values from the sludge. The lead is preferably principally in the form of lead monoxide, lead carbonate and basic lead carbonate, all of which are readily soluble in the preferred electrolytes. These lead compounds are dissolved in an acid suitable for use in an electrolytic cell, preferably fluoboric or fluosilicic acids. Of these two acids, fluoboric acid is preferred as an electrolyte because fewer additives are required than are required with fluosilicic acid. For example, an antifoam agent may be required to control foaming during electrowinning or leaching of the residue when fluosilicic acid is employed. On the other hand, fluosilicic acid is much cheaper. Other acids, such as acetic or nitric acid, can also be used to leach the lead compounds. However, these acids do not readily lead themselves to the electrowinning step hereinafter described.

Prior to dissolution of the lead containing solid product in the acid it is desirable to wash any remaining ammonium sulfate from the product since the ammonium ions would react with the acid and the sulfate ions would react with the lead thereby causing the lead to precipitate as lead sulfate. For maxium lead recovery, the solid product should contain as little entrained soluble sulfate as possible.

Dissolution of the lead may be accomplished by simply leaching the solid product from the sulfur conversion step in an aqueous solution of the acid. The acid solutions are normally 15-25% concentration of acid in water. The solid product can be added to these solutions until up to about 200 q/l of lead are obtained. The dissolution of the soluble lead compounds is very rapid at room temperature.

During dissolution of lead carbonate in the acid leach solutions carbon dioxide gas is generated. If desired, such gas may be recycled for reaction with ammonia to form ammonioum carbonate for use in the carbonate-sulfur conversion step.

The supernatant resulting from the dissolution of the solid sulfur conversion product may be collected by solid liquid separation techniques. The solid product, depending on lead content, such as unreacted lead peroxide or uncoverted lead sulfate, and concentration of other valuable materials, may be discarded or sent to secondary residue treatment.

Where the lead peroxide reduction is not effected prior to the sulfur conversion and acid leaching steps, this product will contain substantial amounts of lead peroxide. This lead peroxide must be reduced in order to permit recovery thereof as metallic lead by means of electrowinning. Upon reduction of such lead peroxide, the resultant compounds may be returned to the acid dissolution stage wherein the soluble lead compounds will dissolve.

Although it is possible to defer lead peroxide reduction until after the sulfur conversion step, such procedure is not recommended. First, the unreduced lead peroxide is very fine and makes solid liquid separation after sulfur conversion more difficult by interfering with the filtering process. Moreover, reduction by means of a reducing roast is extremely difficult to control. This is due to the fact that the residue being roasted at this stage, contains high concentrations of lead peroxide and organic materials. When heated to low temperatures, such as 150° C. to 200° C., the dried materials burn spontaneously causing violent rapid reactions which produce so much heat that the material is often splattered over the container and large droplets of molten lead are formed. Potential exists for production of insoluble lead sulfide from any residual lead sulfate as a result of such reactions. In addition, insoluble lead chloride may be formed by reaction of the lead peroxide with the PVC in the battery sludge. Furthermore, insoluble complex $PbSO_4$-$XPbO$ or $PbO$-$SiO_2$ compounds may be created by the heat. None of these compounds are desirable by-products of the reducing roast since none of them are fully solubilized by the electrolyte. In light of such problems it is preferable to reduce as much lead peroxide as possible prior to or at the same time as the sulfur conversion and leach steps.

The solution resulting from the dissolution of the lead compounds may be treated with additives to facilitate electrolysis. Depending on the acid employed, additives such as glue, aloes, lignosulphonate and other agents may be used to control the deposit of lead at the cathode. Typically glue is added to fluoboric acid, while glue, aloes and lignosulphonate are added to fluosilicic acid.

In order to maximize lead recovery from the solution, the concentration of the acid and lead should be adjusted to about 120 to 300 g/l and about 50 to 200 g/l respectively. The adjusted lead containing solution is placed in an electrolytic cell suitable for electrowinning the lead from solution. Such a cell will have an insoluble anode, preferably composed of graphite. The electrolysis is generally effected at a voltage between 2 and 4 volts and a current density of between 15 and 200 amps/square foot. The higher the current density and the lower the lead level in solution, the less $PbO_2$ is deposited on the anode. The higher the current density, the faster the anode deteriorates at the electrolyte-atmosphere line, the poorer the deposit of lead at the cathode and the greater the problem with transfer of impurity ions, such as antimony, arsenic, and copper, from the electrolyte to the lead deposit becomes. Selection of the optimum operating range thus requires balancing anode life, cathode deposit quality, impurity transfer, and $PbO_2$ generating at the anode. The best operating conditions appear to be between 15-50 amps/square foot current density.

Electrolysis is generally continued until the lead deposit or the current efficiency becomes poor, the latter occurring when lead concentrates are too low. In general, it is preferable to maximize the amount of lead deposited/unit of power. This is typically achieved if lead levels in the electrolyte are reduced only to 30-50 g/l.

Following electrolysis, the stripped electrolyte may then be returned to the leach stage for repeated use. Lead peroxide which has been formed at the anode during the process may be scraped from the anode and the lead therein may be recovered by cycling it back to the reduction stage.

Referring to the drawings, FIG. 1 is a flow diagram depicting the process of the present invention. Battery sludge is fed into a low temperature reduction zone where the lead peroxide is reduced chemically or by means of a low temperature roast or the like. The sludge, containing the products of the peroxide reduction, is introduced into the sulfur conversion stage where it is reacted with an appropriate base or salt. The product of the sulfur conversion is thereupon separated by means of solid-liquid separation techniques. The separated liquid may be discarded. Optionally the liquid may be subjected to conditions which result in the decomposition of the sulfate to sulfur dioxide gas which may be recycled to the reduction stage. Further, if desired, products present in the liquid and/or following sulfate decomposition may be recovered according to conventional separation and/or purification techniques.

The solid product following removal of the liquid resulting from the sulfur conversion stage is leached with an acid suitable for use in an electrolytic cell for electrowinning lead. The carbon dioxide evolved during this leaching step may be recycled to a reactor wherein it is reacted with appropriate reagents to form a carbonate which can in turn be used in the sulfur conversion stage.

The solid residue remaining after the dissolution of the lead is removed by solid-liquid separation techniques. This residue may if desired be recycled to the sulfur conversion stage and/or the reduction stage for further lead recovery. The liquid solution containing the dissolved lead compounds is introduced into an electrolytic zone where the lead is deposited on the cathode. The spent electrolyte from this stage may be recycled to the acid dissolution stage. Further, it desired, the lead dioxide deposit may be recycled to the reduction stage to effect recovery of lead peroxide therein.

Figure 2:
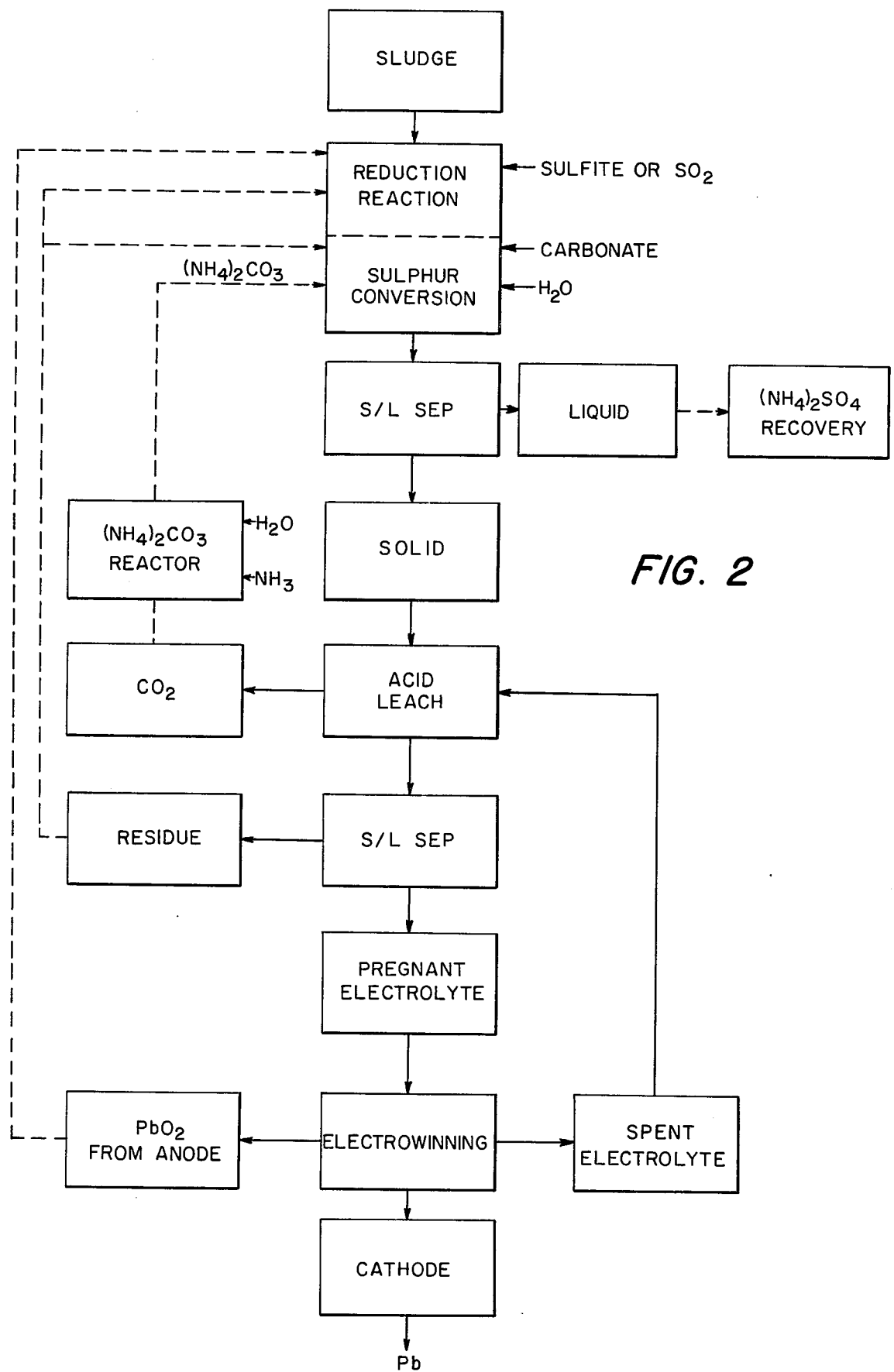
FIG. 2 which is also a flow sheet or block diagram illustates a preferred embodiment of the process set forth in FIG. 1.

The process depicted in FIG. 2 illustrates a preferred embodiment of the process in FIG. 1. According to the process in FIG. 2, the sludge is subjected to chemical reduction with sulfur dioxide or a sulfite or bisulfite, either prior to or simultaneously with the sulfur conversion stage. The sulfur conversion stage is effected by means of a carbonate, which, if it is ammonium carbonate, may in part be supplied by reacting the carbon dioxide generated during the leach step with ammonia and water. Further the ammonium sulfate created during the sulfur conversion stage using ammonium carbonate may be recovered from the liquid resulting from the first solid-liquid separation.

For purposes of this application, all percent concentrations are to be understood to mean weight percentages.

The following examples are illustrative of the invention and are not to be taken in a limiting sense.

EXAMPLE 1

Battery sludge from which the grids and case material had been removed, was heated at 110° C. for 2 hours to thoroughly dry the material. The dried sludge had the following composition:

| Lead | 66% | (soluble lead 6.3%) |
|---|---|---|
| Carbon | 3.6% | |
| Sulphur | 6.7% | |
| Other | 23.7% | |

The dried sludge was roasted at 300° C. for 1 hour in a drying oven. The roasted sludge had the following composition:

| Lead | 70.3% | (soluble lead 22.8%) |
|---|---|---|
| Carbon | 0.5% | |
| Sulphur | 6.9% | |
| Other | 22.3% | |

The roasted sludge was treated with a solution of $(NH_4)_2CO_3$ containing 15% excess $(NH_4)_2CO_3$ to react with all the sulphur present in the roasted sludge. The reacted sludge had the following composition:

|  | Lead | 74.3% | (soluble lead 64.1%) | | |
|---|---|---|---|---|---|
|  | Carbon | 4.1% | | | |
|  | Sulphur | .9% | | | |
|  | Other | 20.7% | | | |
|  | Sludge | Roasted Sludge | $(NH_4)_2CO_3$ Reacted Sludge | $H_2SiF_6$ Leached | % Leached |
| Lead | 133g | 133g | 133g | 21.5g | 83.8% |
| Sulphur | 13.5g | 13.5g | 1.8g | 1.8g | 86.7% |

The results indicate that no sulphur was removed during the reducing roast, while 86.7% was removed during the sulphur conversion stage. When the solid product from the sulfur conversion was leached with $H_2SiF_6$, 83.8% of the lead was leached from solution. The 1.8 g of residual sulphur ties up 11.6 grams of lead as insoluble $PbSO_4$ which are not available to be leached due to incomplete sulphur conversion.

EXAMPLE 2

Battery sludge of the type used in Example 1 was combined with water to produce a slurry of 30% solids and 70% water. The sludge was treated in two ways: with $SO_2$ gas and with $(NH_4)_2SO_3$ to chemically reduce the $PbO_2$.

$SO_2$ Treatment $SO_2$ gas was bubbled through the agitated slurry for 1 hour. $(NH_4)_2CO_3$ was then added to the slurry in an amount equal to 115% of that required to react with all the available sulphur. The solid product was then separated from solution washed and leached with a 20% $HBF_4$ solution. The results are shown below:

|  | Sludge | After $SO_2$ Treatment | After Sulphur Conversion | After $HBF_4$ Leach | % Leached |
|---|---|---|---|---|---|
| Lead | 110.6gr | 110.6 | 110.6 | 5.3 | 95.2 |
| Sulphur | 11.3gr | 14.5 | .6 | .6 | 95.8 |

$(NH_4)_2SO_3$ Treatment $(NH_4)_2SO_3$ was added to the 30% sludge - 70% water slurry in an amount equal to 115% of that required to react with all the $PbO_2$ present in the sludge. In addition, $(NH_4)_2CO_3$ was also added in an amount equal to 115% of the amount necessary to react with all the sulphur present. The solid product was separated from the solution by filtering, washed, and leached in 20% $HBF_4$ solution. The results are shown below:

|  | Sludge | After $(NH_4)_2SO_3$ + $(NH_4)_2CO_3$ Treatment | After $HBF_4$ Leaching | % Leached |
|---|---|---|---|---|
| Lead | 53.8gr | 53.8gr | 1.8gr | 96.7 |
| Sulphur | 5.1gr | .2gr | .2gr | 96.1 |

The amount of lead leached from the sludge, as well as the amount of sulphur removed from the sludge, is increased using the chemical reduction of the $PbO_2$ in combination with the sulphur conversion process.

EXAMPLE 3

550 grams of wet, converted battery sludge, containing 18.6% water was leached with sufficient 20% solution of $HBF_4$ to produce 3 liters of solution. Based on the dried weight of 447.7 grams, the converted sludge contained the following materials:

|  | Wt % | Weight (gr) |
|---|---|---|
| Pb | 74.0 | 331.3 gr |
| Sb | .56 | 2.50 |
| S | .13 | .58 |

After leaching, the residue and leach solution contained the following materials:

| Leach Residue: 34.6 gr | | | | |
|---|---|---|---|---|
| | Composition | Weight | Leached Solution | |
| Pb | 26.4% | 9.1 gr | Pb | 106 g/l |
| Sb | .56% | .19 gr | Sb | .7 g/l |
| S | 1.7% | .58 gr | As | .02 g/l |
|  |  |  | Sn | .04 g/l |
|  |  |  | Fe | .20 g/l |

The leach solution thus leached 97.25% of the lead with essentially no sulfur being leached. In addition 92.4% of the antimony was leached.

2 liters of the leach solution was subjected to electrowinning using a graphite anode and a stainless steel cathode at 2.2 Volts and 5.7 Amperes (24A/sq. ft.) for 4 hours. This resulted in the deposit of 84.5 grams of lead on the cathode. The lead deposit also contained:

| Sb | 0.002% |
|---|---|
| As | <.001% |
| Sn | <.001% |
| Fe | <.001% |
| Ag | <.001% |
| Bi | .008% |

The current efficiency of the electrowinning was 96%.

In addition to the lead deposit, 84.8 grams of $PbO_2$ were deposited on the anode. This could be recovered by recycling it back through the $PbO_2$ reduction process.

What is claimed is:

1. A method for recovering substantially all lead values from battery sludge as metallic lead, which comprises:
   (a) subjecting the sludge to low temperature reducing conditions;
   (b) treating an aqueous solution of the sludge with a compound selected from the group comprising salts and bases which form soluble sulfur-containing materials while converting lead sulfate to insoluble non-sulfur containing compounds;
   (c) separating the resultant solid product by solid-liquid separation techniques;
   (d) leaching the solid product from step (c) with an aqueous solution of an acid suitable for use in an electrolytic cell;
   (e) separating the supernatant resulting from step (d) from the solid residue; and
   (f) electrowinning the lead from the separated supernatant.

2. The method of claim 1 wherein the reducing conditions comprise a reducing roast at a temperature of about 290° C. to 325° C.

3. The method of claim 2 wherein battery scrap is burned to create the reducing roast.

4. The method of claim 1 wherein the reducing conditions comprise bubbling sulfur dioxide gas through the sludge.

5. The method of claim 1 wherein the reducing conditions comprise treating the sludge with a chemical reagent selected from the group consisting of alkali metal and ammonium sulfites and bisulfites.

6. The method of claim 5 wherein the chemical reagent is ammonium sulfite.

7. The method of claim 5 wherein the chemical reagent is sodium sulfite.

8. The method of claim 1 wherein the sludge is treated with a compound selected from the group consisting of ammonium and alkali metal carbonates.

9. The method of claim 8 wherein the compound is ammonium carbonate.

10. The method of claim 1 wherein the acid is fluoboric acid.

11. The method of claim 1 wherein the acid is fluosilicic acid.

* * * * *

UNITED STATES PATENT AND TRADEMARK OFFICE
CERTIFICATE OF CORRECTION

PATENT NO. : 4,229,271
DATED : October 21, 1980
INVENTOR(S) : Raymond D. Prengaman and Herschel B. McDonald It is certified that error appears in the above-identified patent and that said Letters Patent are hereby corrected as shown below:

Column 2, line 26, "illustates" should read --illustrates--.

Column 3, line 5, "to" should read --at--.

Column 3, line 42, "rlatively" should read --relatively--.

Column 5, line 27, "ammmonium" should read --ammonium--.

Column 6, line 19, "lead" should read --lend--.

Column 6, line 35, "q/l" should read --g/l--.

Column 7, line 44, "generating" should read --generation--.

Column 8, line 25, "it" should read --if--.

Signed and Sealed this

Third Day of February 1981

[SEAL]

Attest:

Attesting Officer

RENE D. TEGTMEYER

Acting Commissioner of Patents and Trademarks